(12) United States Patent
Tsai

(10) Patent No.: US 6,555,190 B1
(45) Date of Patent: Apr. 29, 2003

(54) FILMS WITH UV BLOCKING CHARACTERISTICS

(75) Inventor: Mingliang Lawrence Tsai, Holmdel, NJ (US)

(73) Assignee: Honeywell International Inc., Morris Township, NJ (US)

(*) Notice: Subject to any disclaimer, the term of this patent is extended or adjusted under 35 U.S.C. 154(b) by 363 days.

(21) Appl. No.: 09/138,376

(22) Filed: Aug. 24, 1998

Related U.S. Application Data

(60) Provisional application No. 60/064,474, filed on Nov. 6, 1997.

(51) Int. Cl.⁷ ............... B32B 27/08; B32B 27/32; B32B 27/36; B32B 31/04; B32B 31/30

(52) U.S. Cl. ............ 428/36.6; 428/36.7; 428/421; 428/422; 428/480; 428/483; 428/515; 428/516; 428/520; 428/523; 428/910; 264/288.4; 264/290.2; 156/244.11; 156/244.24; 156/297; 156/299; 156/308.2; 156/327; 156/332; 156/334

(58) Field of Search .................. 428/421, 422, 428/480, 483, 35.7, 36.6, 36.7, 36.9, 36.91, 355 AC, 910, 515, 516, 520, 522, 523; 264/280, 290.2, 241, 173.11, 173.12, 173.13, 173.15, 173.16; 156/244.11, 308.2, 327, 299, 332, 297, 334

(56) References Cited

U.S. PATENT DOCUMENTS

| | | | |
|---|---|---|---|
| 3,355,347 A | 11/1967 | Habermann | 161/189 |
| 4,341,825 A * | 7/1982 | Kemski | 428/35 |
| 4,510,301 A | 4/1985 | Levy | 526/254 |
| 4,677,017 A | 6/1987 | DeAntonis et al. | 428/214 |
| 5,139,878 A | 8/1992 | Kim et al. | 428/421 |
| 5,353,985 A * | 10/1994 | Nageli et al. | 229/123.1 |
| 5,474,109 A | 12/1995 | Stoeppelmann et al. | 138/137 |
| 5,874,035 A | 2/1999 | Tsai et al. | 264/173.13 |

FOREIGN PATENT DOCUMENTS

| | | |
|---|---|---|
| EP | 0-132-583 | 2/1985 |
| EP | 0-637-509 | 2/1995 |

* cited by examiner

Primary Examiner—Vivian Chen
(74) Attorney, Agent, or Firm—Roger H. Criss

(57) ABSTRACT

The present invention provides coextruded or laminated multilayer films having at least one layer of a halopolymer such as poly(chlorotrifluoro ethylene) (PCTFE), at least one layer of a naphthalene containing polymer such as poly (ethylene naphthalate) (PEN), and an intermediate adhesive layer. The invention further provides methods of producing oriented, multilayer films which comprise either coextruding or laminating at least one layer of a halopolymer to a surface of at least one layer of a naphthalene containing polymer by an intermediate adhesive layer. The multilayer film may be uniaxially or biaxially stretched, and an optional thermoplastic polymer layer may be attached to another surface of either the halopolymer layer, the naphthalene containing polymer layer, or both, by another intermediate adhesive layer.

33 Claims, 3 Drawing Sheets

FILMS WITH UV BLOCKING CHARACTERISTICS

CROSS REFERENCE TO RELATED APPLICATION

This application claims the benefit of provisional application No. 60/064,474 filed Nov. 6, 1997.

BACKGROUND OF THE INVENTION

1. Field of the Invention

The present invention relates to multilayer films. More particularly, the invention pertains to coextruded or laminated films having at least one layer of a halopolymer such as poly(chlorotrifluoro ethylene) (PCTFE), at least one layer of a naphthalene containing polymer such as poly(ethylene naphthalate) (PEN), poly(butylene naphthalate) (PBN), and the like including copolymers and blends thereof, and an intermediate adhesive layer.

2. Description of the Related Art

It is well known in the art to produce multilayer polymer films. For example, see U.S. Pat. Nos. 4,677,017 and 5,139,878, which are hereby incorporated by reference. Such show a multilayer film having a thermoplastic fluoropolymer layer and a thermoplastic polymeric layer attached to the thermoplastic fluoropolymer layer, preferably via an intermediate adhesive layer. These films may be made by well known lamination and/or coextrusion techniques. Lamination methods are also known from U.S. Pat. No. 3,355,347 which is incorporated herein by reference. These multilayer films may be symmetrical or asymmetrical, oriented or unoriented. The orientation or stretching of films is also known in the art as shown by U.S. Pat. Nos. 4,677,017 and 5,139,878.

It has been a problem in the art to produce a transparent or translucent films with sufficient clarity to protect light sensitive materials, especially in outdoor applications, since many such materials have a tendency to degrade. Films which are used to protect food, medicines, paints, adhesives, biomaterials, chemicals, etc., require properties such as good thermal and environmental stability, excellent moisture barrier, UV blocking characteristics, and transparency in visible light wavelengths.

Fluoropolymers have been commonly used in outdoor applications due to their extraordinary UV light stability. Such include poly(tetrafluoroethylene-co-ethylene) (ETFE), and tetrafluoroethylene-hexafluoropropylene copolymers (FEP), etc. Since they are transparent in most UV light wavelength regions (i.e., 200 nm–400 nm), they cannot adequately protect the contents underneath although they are extremely stable.

It is also known in the art to use UV absorbers, e.g., benzotriazole derivatives, hindered amines, hydroxybenzophenone derivatives, etc. to impart UV blocking characteristics. However, these UV absorbers are low molecular weight materials (i.e., molecular weight less than 1,000) which are either sanctioned for direct food contact and pharmaceutical applications or restricted to be used at a low concentrations due to the tendency of these absorbers to migrate to the film surface. They are also not very thermally stable. As a result their UV blocking characteristics are ineffective and limited, especially in a thin film. Except for fluoropolymers, most moisture barrier polymers are not UV stable. For example, poly(vinylidene chloride) (PVdC) turns yellow and embrittles under UV light. Other moisture barrier polymers, such as polyolefins, also need UV stabilization to prolong their shelf life under severe UV environments.

It has been known that poly(ethylene naphthalate) (PEN) has excellent UV blocking characteristics. However, because of its extremely slow crystallization rate, PEN is very brittle and its cast film cannot be used alone as a free standing film. Therefore, only oriented PEN film is commercially available. However due to its already highly oriented structure, it cannot be thermoformed into blister packages for pharmaceutical applications. PEN polymer also lacks moisture barrier as compared to PVdC or PCTFE; and as a result, it is rarely used as a moisture packaging material. PEN polymer is known to lack chemical resistance and it is seldom used in an outdoor application by itself Poly(chlorotrifluoro ethylene) (PCTFE) polymer has excellent moisture barrier and non-stick property despite its lack of UV blocking characteristics.

SUMMARY OF THE INVENTION

The invention provides a multilayer film which comprises at least one halopolymer layer, attached to at least one naphthalene containing polymer layer by an intermediate adhesive layer.

The invention also provides a method of producing a multilayer film which comprises coextruding at least one layer of a halopolymer, and at least one naphthalene containing polymer layer attached to the halopolymer layer via an intermediate adhesive layer.

The invention further provides a method of producing a multilayer film which comprises laminating at least one layer of a halopolymer to a layer of a naphthalene containing polymer by an intermediate adhesive layer.

The invention achieves a multilayer film with enhanced UV blocking characteristics, a non-stick surface as well as moisture protection. The combination of a naphthalene containing film and a halopolymer film provides a multilayer film that blocks light in UV wavelength (i.e., 200–400 nm), is transparent in the visible light range (i.e., 400–800 nm), is stable in an outdoor environment, and has excellent moisture barrier properties and chemical resistance.

It would be desirable to produce a multilayer film which is a combination of a PEN polymer layer and a PCTFE layer not only blocks light in the UV wavelength while maintaining transparency in the visible light region, but is also stable environmentally due to the excellent moisture protection and chemical resistance provided by PCTFE. It would also be desirable to produce a multilayer film by combining PEN and PCTFE films through an intermediate adhesive polymer to alleviate the brittle nature of cast PEN film and allow the film to have a practical use.

DETAILED DESCRIPTION OF THE PREFERRED EMBODIMENT

Figure 1:
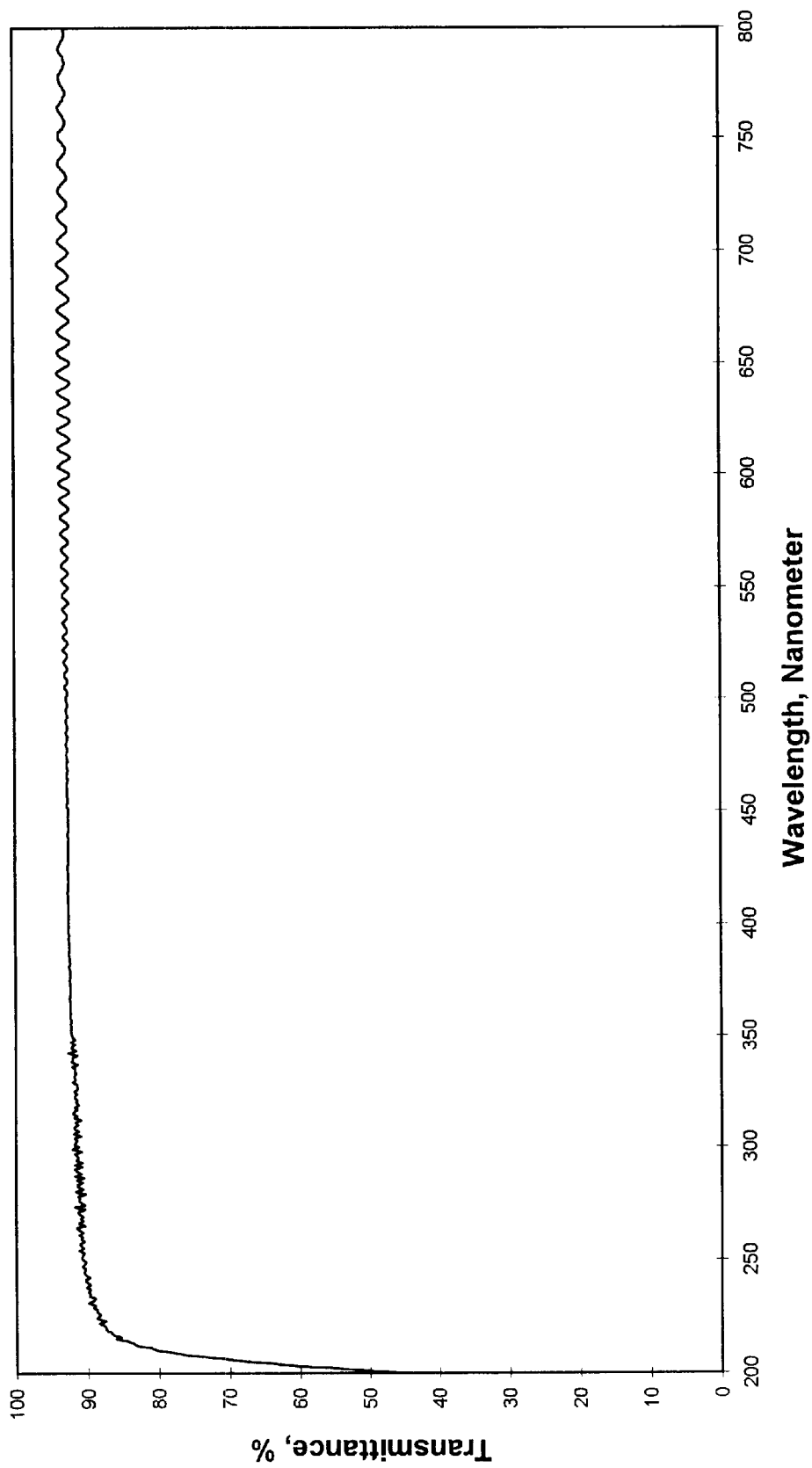
FIG. 1 shows the UV-Vis spectrum of a monolayer PCTFE film produced according to comparative Example 1.

In the practice of the present invention, a multilayer film is prepared which is composed of a halopolymer layer attached to a naphthalene containing polymer layer. The halopolymer layer is attached to the naphthalene containing polymer layer by an intermediate adhesive layer.

The halopolymer layer may be comprised of homopolymer and copolymers of fluoropolymers, chloropolymers or fluorochloropolymers having from about 2 to about 20 carbon atoms wherein at least one carbon atom is substituted with at least one halogen atom and blends thereof.

Specific examples of suitable halopolymers include poly (chlorotrifluoro ethylene) (PCTFE) homopolymers and copolymers, ethylene chlorotrifluoroethylene copolymer, ethylene tetrafluoroethylene copolymer, fluorinated ethylene-propylene copolymers (FEP), perfluoroalkoxy polymer (PFA), poly(vinylidene fluoride), poly(vinyl fluoride), poly(vinylidene chloride), poly(vinyl chloride), homopolymers and copolymers of tetrafluoroethylene, homopolymers and copolymers of hexafluoropropylene, homopolymers and copolymers of vinylidene fluoride and mixtures thereof Such halopolymers are readily commercially available or can be easily produced by means well known in the art.

The second component of the inventive structure is a layer of a naphthalene containing polymer that is attached to the halopolymer layer. Naphthalene-containing polymers useful in this invention disclosure are characterized by the presence of recurring carbonylester or carbonamide functional groups as an integral part of the polymer chain. Such naphthalene containing polymers are also readily commercially available or can be easily produced by means well known in the art.

Illustrative examples of polyesters are those having recurring monomeric units represented by the general formula:

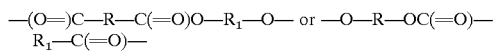
—$R_1$—C(=O)— where R is naphthalene unit, and $R_1$ is alkylene group having at least two carbon atoms, preferably alkylene having about 2 to about 12 carbon atoms, or arylene group, preferably substituted or unsubstituted phenylene, alkylenephenylene or dialkylenephenylene and wherein the aliphatic moieties have from 1 to about 7 carbon atoms wherein permissible substituents are alkyl, alkoxy or halo.

Illustrative examples of polyamides are those having recurring monomeric units represented by the general formula:

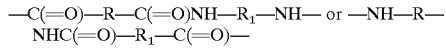
NHC(=O)—$R_1$—C(=O)— where R is naphthalene unit and $R_1$ is alkylene group of at least two carbon atoms preferably alkylene having about 2 to about 12 carbon atoms or arylene group, preferably substituted or unsubstituted phenylene, alkylenephenylene or dialkylenephenylene and wherein the aliphatic moieties have from 1 to about 7 carbon atoms wherein permissible substituents are alkyl, alkoxy or halo.

The naphthalene unit of R can be based on di-ol, di-amine, di-carboxylic acid, or di-carboxylate, i.e., 1,5-naphthalenediol, 1,5-naphthalenediamine, 1,5-naphthalenedicarboxylic acid, 2,6-naphthalenedicarboxylic acid, di-methyl-2,6-naphthalene dicarboxylate, 2,6-naphthalenediol, 2,6-naphthalenediamine, 2,7-naphthalenedicarboxylic acid, etc.

Suitable naphthalene containing polymers non-exclusively include poly(ethylene naphthalate) (PEN), poly (butylene naphthalate) (PBN), and copolymers and mixtures thereof. Blends and copolymers formed from above recurring units of the above referenced polyesters or polyamides may also be used. By ways of illustration and not limitation, such polyester copolymers include poly(ethylene terephthlate-co-ethylene naphthalate) (PET-co-PEN), poly (butylene terephthlate-co-ethylene naphthalate) (PBT-co-PEN), PET-co-PBN, PBT-co-PBN; and the like.

The preferred means of attachment between each halopolymer layer and naphthalene containing polymer layer is an adhesive layer, also referred to in the art as a "tie" layer. In accordance with the present invention, suitable adhesive polymers non-exclusively include modified polyolefin compositions having at least one functional moiety selected from the group consisting of unsaturated polycarboxylic acids and anhydrides thereof.

Other adhesives can be copolymers of ethylene, modified or unmodified with unsaturated carboxylic acids and anhydrides. They can be also be homopolymers or a copolymers of acrylic acid, alkyl acrylic acid, acrylates, alkyl acrylates and blends thereof which can be modified with unsaturated carboxylic acids and anhydrides. Unsaturated carboxylic acid and anhydrides include maleic acid and anhydride, fumaric acid and anhydride, crotonic acid and anhydride, citraconic acid and anhydride, itaconic acid and anhydride and the like. Of these, the most preferred is maleic anhydride. Other adhesive layers non-exclusively include alkyl ester copolymers of olefins and alkyl esters of α,β-ethylenically unsaturated carboxylic acids such as those described in U.S. Pat. No. 5,139,878. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878.

The multilayer films of the present invention can have a variety of structures. A typical film structure includes a three-layer structure, which comprises a naphthalene containing polymer layer, an adhesive layer and a halopolymer layer. Another typical film structure is a five-layer structure, which comprises a naphthalene containing polymer layer, an adhesive layer, a halopolymer layer, another adhesive layer and another naphthalene containing polymer layer. Another variation is a five-layer structure which comprises a halopolymer layer, an adhesive layer, a naphthalene containing polymer layer, another adhesive layer and another halopolymer layer. These are only three of many possible combinations of multilayer film structures, and any variation of the order and thickness of the layers of the halopolymer and naphthalene containing polymer layer can be made.

The multilayer films of this invention may be produced by conventional methods useful in producing multilayer films, including coextrusion, extrusion lamination and adhesive lamination techniques. Suitable coextrusion techniques are described in U.S. Pat. Nos. 5,139,878 and 4,677,017. Coextrusion techniques include methods which include the use of a feed block with a standard die, a multimanifold die such as a circular die, as well as a multimanifold die such as used in forming multilayer films for forming flat cast films and cast sheets.

One advantage of coextruded films is the formation of a multilayer film in a one process step by combining molten layers of each of the film layers of halopolymer, tie layer composition, and naphthalene containing polymer, as well as optionally more film layers, into a unitary film structure. In order to produce a multilayer film by a coextrusion process, it is necessary that the constituents used to form each of the individual films be compatible with the film extrusion process. The term "compatible" in this respect means that the film-forming compositions used to form the films have melt properties which are sufficiently similar so as to allow coextrusion. Melt properties of interest include, for example, melting points, melt flow indices, apparent viscosity, as well as melt stability. It is important that such compatibility be present to assure the production of a multilayer film having good adhesion and relatively uniform thickness across the width of the film being produced. As is known in the art, film-forming compositions which are not sufficiently compatible to be useful in a coextrusion process frequently produce films having poor interfacial lamination, poor physical properties as well as poor appearance.

One skilled in the art can readily weigh the above-noted compatibility in order to select polymers having desirable physical properties and determine the optimal combination of relative properties in adjacent layers without undue experimentation. If a coextrusion process is used, it is important that the constituents used to form the multilayer film be compatible within a relatively close temperature range in order to permit extrusion through a common die.

Alternatively, the multilayer films of the present invention can be produced by lamination whereby a multilayer film structure is formed from pre-fabricated film plies. The basic methods used in film laminating techniques are fusion, wet combining, and heat reactivating. Fusion, which is a method of laminating two or more film plies using heat and pressure without the use of other adhesives can only be used where the films being laminated are comprised of polymers that readily form interfacial adhesion. Wet combining and heat reactivating are utilized in laminating incompatible films using adhesive materials.

Typically, laminating is done by positioning the individual layers of the inventive film on one another under conditions of sufficient heat and pressure to cause the layers to combine into a unitary film. Typically the halopolymer, adhesive, and naphthalene containing polymer layers are positioned on one another, and the combination is passed through the nip of a pair of heated laminating rollers by techniques well known in the art such as those described in U.S. Pat. No. 3,355,347 which is incorporated herein by reference. They can be laminated in single pass where the adhesive layer, which can be either a molten polymer, water or solvent based adhesives, or solventless adhesives, combines the naphthalene containing polymer with the halopolymer, which is preferably corona treated on the surface and then primed with an adhesion promoting layer (i.e., primer). They can also be laminated in multiple passes (or stations) where the halopolymer and the adhesive layer are first combined in a first pass (station), followed by the lamination of naphthalene containing polymer in a second pass (station). Lamination heating may be done at temperatures ranging from about 120° C. to about 175° C., preferably from about 150° C. to about 175° C. at pressures ranging from about 5 psig (0.034 MPa) to about 100 psig (0.69 MPa) for from about 5 seconds to about 5 minutes, preferably from about 30 seconds to about 1 minute.

The multilayer film, whether comprising a three or more layer structure, may be stretched or oriented in any desired direction using methods well known to those skilled in the art. Examples of such methods include those set forth in U.S. Pat. No. 4,510,301. In such an orienting operation, the film may be oriented uniaxially in either the direction coincident with the direction of movement of the film being withdrawn from the casting roll, also referred to in the art as the "longitudinal" direction, or in the direction which is perpendicular to the longitudinal direction, also referred to in the art as the "transverse" direction, or biaxially in both the longitudinal direction and the transverse direction. The multilayer film of the invention are particularly useful for manufacturing multicomponent articles by processes known in the art. For example, the invention can be used to prepare coextruded articles such as film and tubing, laminates such as film and sheet, and injection molded and blow molded articles. The invention may also be useful in forming thermoformed three dimensionally shaped articles such as blister packaging for pharmaceuticals. This may be done by forming the film around a suitable mold and heating in a method well known in the art. The films of the present invention have sufficient dimensional stability to be stretched at least 1.5 and preferably more than three times and more preferably from more than three times to about ten times in either the longitudinal direction or the transverse direction or both.

Although each layer of the multilayer film structure may have a different thickness, the thickness of each of the halopolymer and naphthalene containing polymer layers of the films in the post-stretched multilayer films structure is preferably from about 0.05 mils (1.3 $\mu$m) to about 100 mils (2540 $\mu$m), more preferably from about 0.05 mils (1.3 $\mu$m) to about 50 mils (1270 $\mu$m) and most preferably from about 0.50 mils (12.7 $\mu$m) to about 10 mils (254 $\mu$m). The thickness of the post-stretched adhesive layer may vary, but is generally in the range of from about 0.02 mils (0.5 $\mu$m) to about 12 mils (305 $\mu$m), preferably from about 0.05 mils (1.3 $\mu$m) to about 1.0 mils (25 $\mu$m), and most preferably from about 0.1 mils (25 $\mu$m) to about 0.8 mils (20 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

One preferred embodiment of the invention provides a multilayer film structure which comprises a halopolymer layer attached to a naphthalene containing polymer layer, wherein an intermediate adhesive layer is the preferable means of attachment. In another embodiment, an optional layer of a thermoplastic polymer is attached to another surface of either the naphthalene containing polymer layer or the halopolymer layer or both, by another intermediate adhesive layer. Such thermoplastic polymer layers may be such materials as polyamides, polyesters, polyolefins, polyacrylonitrile, polystyrene, polyvinylchloride, polyvinylidene chloride, ethylene vinyl acetate, PETG, polyacrylates, polyurethanes, etc. and mixtures and copolymers thereof. Polyamides include crystalline and amorphous nylon such as nylon 4, nylon 6, nylon 6,6, nylon 7, nylon 8, nylon 9, nylon 11, nylon 12, nylon 4,2, nylon 4,6, nylon 4,I, nylon 6,9, nylon 6,10, nylon 6,I, nylon MXD6, nylon 6,12, nylon 6,6,6, nylon 6,6/6I, nylon 6,6,6T, nylon trimethyl 6,2/6,2, nylon 6,6/6,9/6. Polyesters include polyethylene terephthalate and polybutylene terephthalate. Polyolefins include polyethylene, polypropylene and polybutylene.

Each of the layers of the multilayer film structure may contain other art recognized additives such as UV stabilizers and absorbers, colorants such as dyes and pigments, fillers, slip additives, plasticizers, lubricants, antiblocking agents, antioxidants, and heat stabilizers in amounts well known in the art. Such may be present in an amount of about 10% or less based on the weight of the layer.

Commonly used UV absorbers and stabilizers can be added to any of the layers of the present invention in order to extend the UV blockage wavelength from about 375 nm to about 400 nm. These UV absorbers and stabilizers include substituted or nonsubstituted benzotriazole derivatives, benzotriazine derivatives, hindered amines, hydroxybenzophenone derivatives, etc. Examples are 2-(2'-hydroxy-5'-methylphenyl)benzotriazole, 2-(3'-tert-butyl-2'-hydroxy-5'-methylphenyl)-5-chlorobenzotriazole, 2-(3',5'-di-tert-butyl-2'-hydroxyphenyl)-5-chlorobenzotriazole, 2,2'-dihydroxy-4,4'-dimethoxybenzophenone, 2-(4,6-diphenyl-1,3,5-triazin-2-yl)-5-(hexyl)oxyl-phenol, 2-(4,6-bis(2,4-dimethylphenyl)-1,3,5-triazin-2-yl-5-octyloxy)phenol, 2-(2'-hydroxy-5'-methylphenyl)benzotriazole, etc.

Commonly used color pigments or dyes that can be added to any of the layers of the present invention in order to extend the UV/visible wavelength blockage to a higher wavelength, i.e., 480–500 nm include metal oxides, e.g., titanium oxide, carbon black, and oxidic colored pigments, etc. The organic pigments include azo compounds (monoazo, diazo, salts of azo color acids, etc.), non-azo pigments (polycyclic structure, such as phthalocyanine, quinacridones, perylene, naphthalene tetracarboxylic acid derivatives, etc.), fluorescent pigments (naphthazine, etc.), organic dyes (anthraquinone, quinophthalone, pyrazolone, xanthene, azine, etc.); and the like.

The following nonlimiting examples serve to illustrate the invention.

EXAMPLE 1 (COMPARATIVE)

Poly(chlorotrifluoro ethylene) (PCTFE) homopolymer (density: 2.11 gm/cc, melting point: 211° C., manufactured by AlliedSignal Inc.—Aclon HP) was extruded through a 3.2 cm (1.25") diameter Killion single screw extruder (L/D=24/1) equipped with three heating zones and two adapter zones. The extruder barrel temperature was set at 271° C., 316° C., 316° C. for the zone 1–3 and the adapters were maintained at 307° C. The melt temperature was measured at 312° C. The extrudate, after passing through an extrusion film die maintained at 288° C., was then cast on a roll kept at 49° C., followed by a cooling roll set at 32° C. The resultant monolayer film has a thickness of 15 $\mu$m. The film was then tested in a UV-VIS-NIR spectrophotometer (Cary 5E, manufactured by Varian Analytical Instruments). FIG. 1 is the UV-Vis spectrum of this monolayer PCTFE film. As can be seen, the spectrum is very clear, i.e., higher than 80% transmittance, from about 215 nm up to 400 nm in the UV wavelength range as well as in the visible wavelength region from 400 nm to 800 nm.

EXAMPLE 2

A three layer film was coextruded using a PCTFE homopolymer (same as Example 1), a poly(ethylene naphthalate) (PEN) homopolymer (melting point: 280° C., intrinsic viscosity: 1.64, made by Du Pont), and a maleic anhydride modified polyolefin tie resin (density: 0.88 gm/cc, melt index: 0.4 gm/10 min. at 190° C., made by Mitsui Chemicals America, Inc.) to make the following structure: PCTFE/tie/PEN. Poly(ethylene naphthalate), after drying at 121° C. for 8 hours, was extruded through a 3.8 cm (1.5") diameter Killion single screw extruder (L/D=24/1) equipped with three heating zones and two adapter zones. The extruder barrel temperature were set at 293° C., 307° C., 310° C. and the adapters were maintained at 307° C. The melt temperature was 302° C. The maleic anhydride modified tie resin was extruded through a 3.2 cm (1.25") diameter Killion single screw extruder equipped with four heating zones and two adapter zones. The extruder barrel temperature were set at 193° C., 227° C., 279° C., 285° C. and the adapters were maintained at 285° C. The melt temperature was 285° C. PCTFE homopolymer was extruded following the same procedure described in Example 1. The three-layer extrudate, after passing through a coextrusion film die maintained at 288° C., was then cast on a roll kept at 49° C., followed by a cooling roll set at 32° C. The resultant three layer film had a overall thickness of 36 $\mu$m, where the PCTFE layer alone is about 9 $\mu$m, the PEN layer is about 16 $\mu$m, and the tie resin is about 11 $\mu$m.

Figure 2:
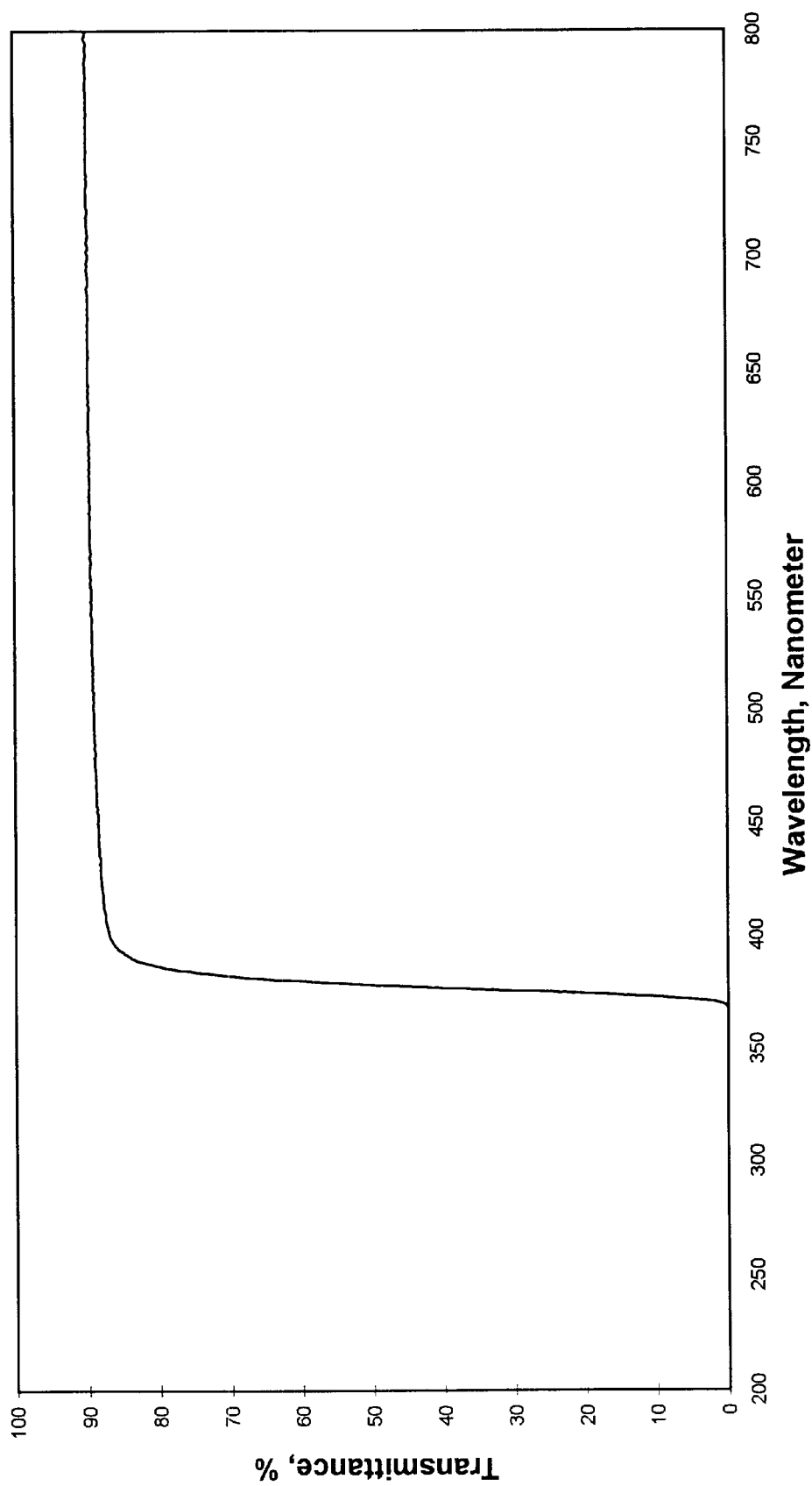
FIG. 2 shows the UV-Vis spectrum of a three layer film produced according to the invention in Example 2.

The three-layer film was tested in a UV-VIS-NMR spectrophotometer. FIG. 2 is the UV-Vis spectrum of this three layer film. As can be seen, the UV wavelength from 200 nm to about 375 nm was completely blocked while the spectrum is extremely clear (greater than 80% transmittance) at wavelength from about 380 nm to 800 nm. What this spectrum means is that the incorporation of PEN almost blocks the entire UV wavelength region, while transmitting all of the visible light. Moisture barrier, measured by water vapor transmission rate (WVTR) based on ASTM F1249, was about 0.682 gm/m$^2$/day at 37.8° C. and 100% RH for the three layer film (PCTFE/tie/PEN) versus 18.6 gM/m$^2$/day at 37.8° C. and 100% RH of the control of 16 $\mu$m cast monolayer PEN film. This shows an almost 27 fold moisture barrier improvement.

The multilayer film was also tested for mechanical properties (ASTM D882) and puncture resistance (ASTM F1306) using 16 $\mu$m cast monolayer PEN as a control. The brittleness of the control film was determined to have a low yield elongation, i.e., about 150%, and low puncture resistance, i.e., 80 gm. On the other hand, the incorporation of PCTFE and the adhesive layer significantly increases the yield elongation to 230% and the puncture resistance to 250 gm.

EXAMPLE 3

Figure 3:
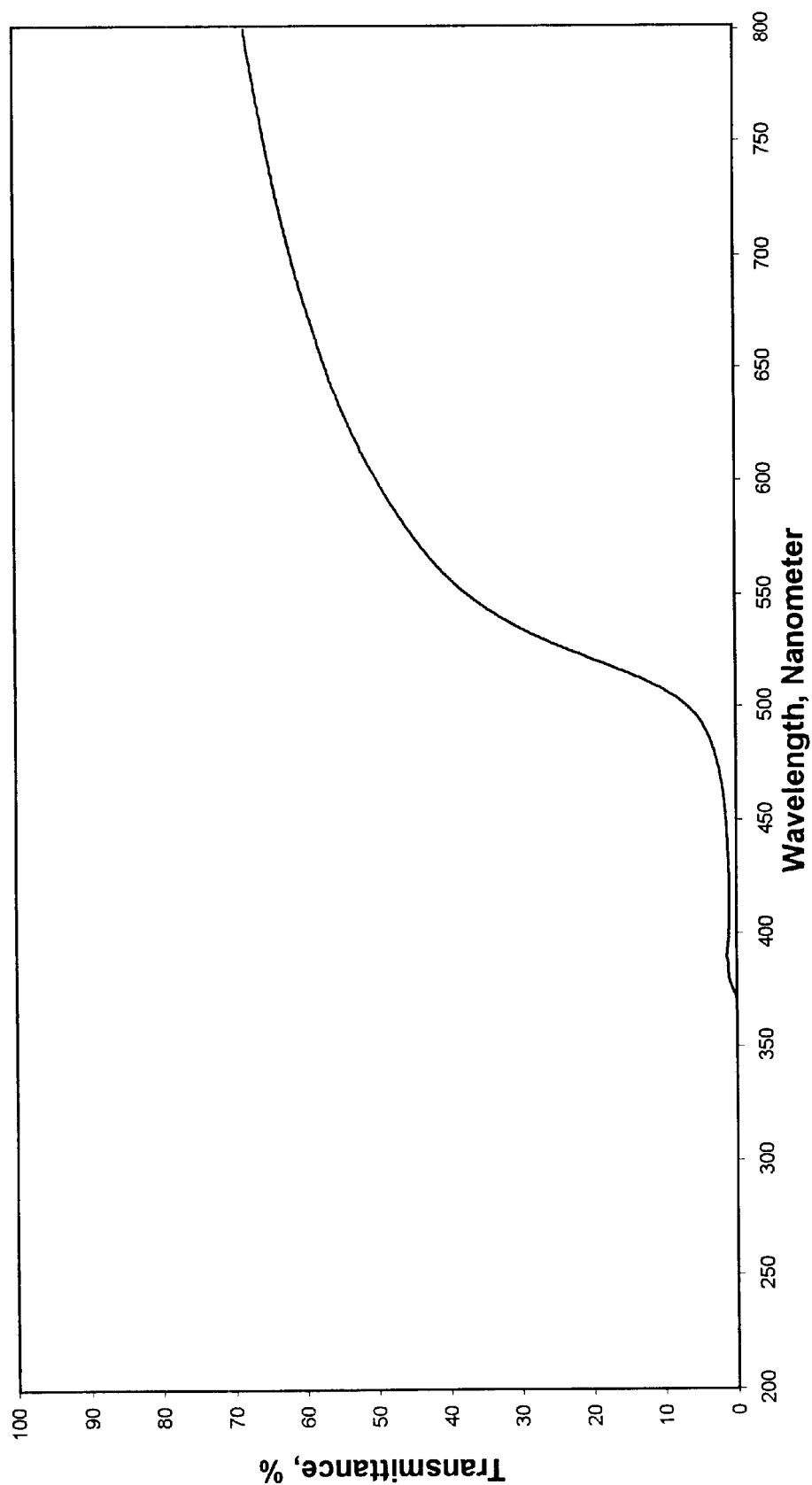
FIG. 3 shows UV-Vis spectrum of a laminate structure produced according to the invention in Example 3.

The three-layer film described in Example 2 was subsequently laminated to a 200 $\mu$m thick polyethylene substrate containing a yellow pigment (color master batch compounded by Reed Spectrum). The laminate was then tested in a UV-VIS-NIR spectrophotometer, in which the UV-Vis spectrum is shown in FIG. 3. In this example, a further light wavelength blockage from 200 nm to about 480 nm was demonstrated.

As can be seen from the above examples, a good moisture barrier, UV barrier film can be prepared according to the present invention. While the invention has been shown and described with reference to a preferred embodiment, it is not to be considered limited thereby, but only construed in accordance with the following claims.

What is claimed is:

1. A multilayer flat film structure which comprises at least one halopolymer layer which comprises at least one component selected from the group consisting of homopolymers and copolymers of fluoropolymers and chlorofluoropolymers, and at least one naphthalene containing polymer layer attached to the halopolymer layer by an intermediate adhesive layer.

2. The multilayer flat film structure of claim 1 wherein the intermediate adhesive layer comprises an olefin-containing polymer selected from the group consisting of at least one functionalized polyolefin: at least one copolymer of ethylene and at least one monomer selected from the group consisting of acrylic acid, alkyl acrylic acid, acrylates and alkyl acrylates, and blends thereof.

3. The multilayer flat film structure of claim 1 further comprising another halopolymer layer attached to the naphthalene containing polymer layer by another intermediate adhesive layer.

4. The multilayer flat film structure of claim 1 further comprising another naphthalene containing polymer layer attached to the halopolymer layer by another intermediate adhesive layer.

5. The multilayer flat film structure of claim 1 further comprising a layer of a thermoplastic polymer attached to the naphthalene containing polymer layer by another intermediate adhesive layer.

6. The multilayer flat film structure of claim 1 further comprising a layer of a thermoplastic polymer attached to the halopolymer polymer layer by another intermediate adhesive layer.

7. The multilayer flat film structure of claim 1 further comprising a layer of a thermoplastic polymer attached the naphthalene containing polymer layer by an intermediate adhesive and another thermoplastic polymer layer attached to the halopolymer layer by another intermediate adhesive layer, which thermoplastic polymer layers independently comprise one or more materials selected from the group consisting of polyamides, polyesters, polyolefins, polyacrylonitrile, polystyrene, polyacrylates, polyurethanes, polyvinyl chloride and copolymers and mixtures thereof.

8. The multilayer flat film structure of claim 1 wherein the film structure is uniaxially oriented or biaxially oriented.

9. The multilayer flat film structure of claim 1 wherein the halopolymer layer comprises fluoropolymers, chloropolymers or fluorochloropolymers having from about 2 to about 20 carbon atoms wherein at least one carbon atom is substituted with at least one halogen atom.

10. The multilayer flat film structure of claim 1 wherein the halopolymer layer comprises a material selected from the group consisting of poly(chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), homopolymers and copolymers of tetrafluoroethylene, homopolymers and copolymers of hexafluoropropylene, homopolymers and copolymers of vinylidene fluoride and mixtures thereof.

11. The multilayer flat film structure of claim 1 wherein the naphthalene containing polymer layer is selected from the group consisting of poly(ethylene naphthalate), poly(butylene naphthalate), and copolymers and mixtures thereof.

12. The multilayer flat film structure of claim 1 wherein the halopolymer layer comprises poly(chlorotrifluoro ethylene) homopolymers and copolymers and the naphthalene containing polymer layer comprises poly(ethylene naphthalate) homopolymers and copolymers.

13. The multilayer flat film structure of claim 1 wherein at least one of the layers contains one or more additives selected from the group of UV stabilizers, UV absorbers, colorants, fillers, slip additives, plasticizers, lubricants, antiblocking agents, antioxidants, and heat stabilizers.

14. A method or producing an oriented, multilayer flat film structure which comprises coextruding and attaching a layer of a halopolymer which comprises at least one component selected from the group consisting of homopolymers and copolymers of fluoropolymers and chlorofluoropolymers, to a naphthalene containing polymer layer by a coextruded intermediate adhesive layer.

15. The method of claim 14 further comprising coextruding and attaching another naphthalene containing polymer layer to the halopolymer layer by another intermediate adhesive layer.

16. The method of claim 14 further comprising coextruding and attaching another layer of a halopolymer to the naphthalene containing polymer layer by another intermediate adhesive layer.

17. The method of claim 14 further comprising attaching a layer of a thermoplastic polymer to the naphthalene containing polymer layer by an intermediate adhesive layer and attaching another thermoplastic polymer layer to the halopolymer layer by another intermediate adhesive layer.

18. The method of claim 14 further comprising uniaxially orienting or biaxially orienting the film.

19. The method of claim 14 wherein the halopolymer layer comprises fluoropolymers, chloropolymers or fluorochloropolymers having from about 2 to about 20 carbon atoms wherein at least one carbon atom is substituted with at least one halogen atom.

20. The method of claim 14 wherein the halopolymer layer comprises a material selected from the group consisting of poly(chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), homopolymers and copolymers of tetrafluoroethylene, homopolymers and copolymers of hexafluoropropylene, homopolymers and copolymers of vinylidene fluoride and mixtures thereof.

21. The method of claim 14 wherein the naphthalene containing polymer layer comprises a material selected from the group consisting of poly(ethylene naphthalate), poly(butylene naphthalate), copolymers and mixtures thereof.

22. The method of claim 14 wherein the halopolymer layer comprises poly(chlorotrifluoro ethylene) homopolymers and copolymers and the naphthalene containing polymer layer comprises poly(ethylene naphthalate) homopolymers and copolymers.

23. A method of producing a multilayer flat film structure which comprises laminating a layer of a halopolymer which comprises at least one component selected from the group consisting of homopolymers and copolymers of fluoropolymers and chlorofluoropolymers, to a layer of a naphthalene containing polymer by an intermediate adhesive layer.

24. The method of claim 23 further comprising laminating another layer of a naphthalene containing polymer layer to the halopolymer layer by another intermediate adhesive layer.

25. The method of claim 23 further comprising laminating another layer of a halopolymer to the naphthalene containing polymer layer by another intermediate adhesive layer.

26. The method of claim 23 further comprising attaching a layer of a thermoplastic polymer to both another surface of the naphthalene containing polymer layer and another surface of the halopolymer layer by another intermediate adhesive layer.

27. The method of claim 23 further comprising uniaxially orienting or biaxially orienting the film.

28. The method of claim 23 wherein the halopolymer layer comprises at least one fluoropolymer, chloropolymer or fluorochloropolymers having from about 2 to about 20 carbon atoms wherein at least one carbon atom is substituted with at least one halogen atom.

29. The method of claim 23 wherein the halopolymer layer comprises a material selected from the group consisting of poly(chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), homopolymers and copolymers of tetrafluoroethylene, homopolymers and copolymers of hexafluoropropylene, homopolymers and copolymers of vinylidene fluoride and mixtures thereof.

30. The method of claim 23 wherein the naphthalene containing polymer layer comprises a material selected from the group consisting of poly(ethylene naphthalate), poly (butylene naphthalate), copolymers and mixtures thereof.

31. The method of claim 23 wherein the halopolymer layer comprises a material selected from the group consisting of poly(chlorotrifluoro ethylene) homopolymers and copolymers and the naphthalene containing polymer layer comprises a material selected from the group consisting of poly(ethylene naphthalate) homopolymers and copolymers.

32. A packaging film in the form of a multilayer flat film structure which comprises at least one halopolymer layer which comprises at least one component selected from the group consisting of homopolymers and copolymers of fluoropolymers and chlorofluoropolymers, and at least one naphthalene containing polymer layer attached to the halopolymer layer by an intermediate adhesive layer.

33. A packaging film for foods and pharmaceuticals in the form of a multilayer flat film structure which comprises at least one halopolymer layer which comprises at least one component selected from the group consisting of homopolymers and copolymers of fluoropolymers and chlorofluoropolymers, and at least one naphthalene containing polymer layer attached to the halopolymer layer by an intermediate adhesive layer.

* * * * *